United States Patent
Pandya et al.

(10) Patent No.: US 9,306,756 B2
(45) Date of Patent: *Apr. 5, 2016

(54) POLICY AND CHARGING RULES NODE EXPIRED MESSAGE HANDLING

(71) Applicant: ALCATEL-LUCENT, Paris (FR)

(72) Inventors: Ajay Kirit Pandya, Ottawa (CA); Mike Vihtari, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 367 days.

This patent is subject to a terminal disclaimer.

(21) Appl. No.: 13/792,405

(22) Filed: Mar. 11, 2013

(65) Prior Publication Data

US 2013/0182715 A1 Jul. 18, 2013

Related U.S. Application Data

(63) Continuation of application No. 12/708,087, filed on Feb. 18, 2010, now Pat. No. 8,447,717.

(51) Int. Cl.
*H04L 12/14* (2006.01)
*H04L 12/947* (2013.01)

(52) U.S. Cl.
CPC ............ *H04L 12/1407* (2013.01); *H04L 12/14* (2013.01); *H04L 12/1403* (2013.01); *H04L 12/1425* (2013.01); *H04L 49/25* (2013.01)

(58) Field of Classification Search
CPC . H04L 12/14; H04L 12/1403; H04L 12/1407; H04L 12/1425; H04L 49/25
See application file for complete search history.

(56) References Cited

U.S. PATENT DOCUMENTS

| 8,949,928 | B2* | 2/2015 | Perez Martinez | H04L 45/04 726/1 |
|---|---|---|---|---|
| 2008/0153458 | A1* | 6/2008 | Noldus et al. | H04L 12/1421 455/406 |
| 2010/0274816 | A1* | 10/2010 | Guzik | G11B 27/034 707/802 |
| 2011/0026466 | A1* | 2/2011 | Zhou | H04L 12/14 370/328 |
| 2011/0314145 | A1* | 12/2011 | Raleigh | H04L 41/0893 709/224 |
| 2012/0023246 | A1* | 1/2012 | Castro Castro | H04L 41/0893 709/229 |

(Continued)

OTHER PUBLICATIONS

Digital cellular telecommunications system (Phase 2+);, Universal Mobile Telecommunications System (UMTS); Policy and charging control signalling flows and Quality of Service (QoS) parameter mapping (3GPP TS 29.213 version 7.4.0 Release 7).*

(Continued)

*Primary Examiner* — Omer S Mian
(74) *Attorney, Agent, or Firm* — Kramer & Amado, P.C.

(57) ABSTRACT

Various exemplary embodiments relate to a method and related network node and machine-readable storage medium including a policy and charging rules node (PCRN) receiving a plurality of related service requests from different devices. The PCRN may proceed to generate a policy and charging control (PCC) rule based on at least one service request and other information stored in the PCRN if a mate service request does not arrive during the duration of a waiting timer. If the mate service request arrives subsequent to the expiry of the waiting timer, the PCRN may then generate a subsequent PCC rule to replace the previously generated rule, with the new PCC rule incorporating information from both of the mate service requests.

20 Claims, 11 Drawing Sheets

(56) References Cited

U.S. PATENT DOCUMENTS

| | | | |
|---|---|---|---|
| 2012/0310804 A1* | 12/2012 | Raleigh | G06Q 30/0601 705/34 |
| 2012/0331516 A1* | 12/2012 | Perez Martinez | H04L 63/0245 726/1 |
| 2013/0188554 A1* | 7/2013 | Cai | H04M 15/65 370/328 |
| 2013/0262308 A1* | 10/2013 | Cai | G06Q 20/145 705/44 |
| 2013/0279521 A1* | 10/2013 | Perez Martinez | H04L 12/1407 370/468 |
| 2014/0086052 A1* | 3/2014 | Cai | H04L 47/748 370/235 |
| 2014/0179263 A1* | 6/2014 | Collins | H04L 43/00 455/405 |
| 2015/0036496 A1* | 2/2015 | Shan | H04W 88/06 370/235 |
| 2015/0103772 A1* | 4/2015 | Carnero Ros | H04L 45/04 370/329 |

OTHER PUBLICATIONS

Annex to Form PCT/ISA/206—Communication Relating to the Results of the Partial International Search for PCT/IB2011/000472. (Filed in parent case).

* cited by examiner (SHEET 1 OF 2)

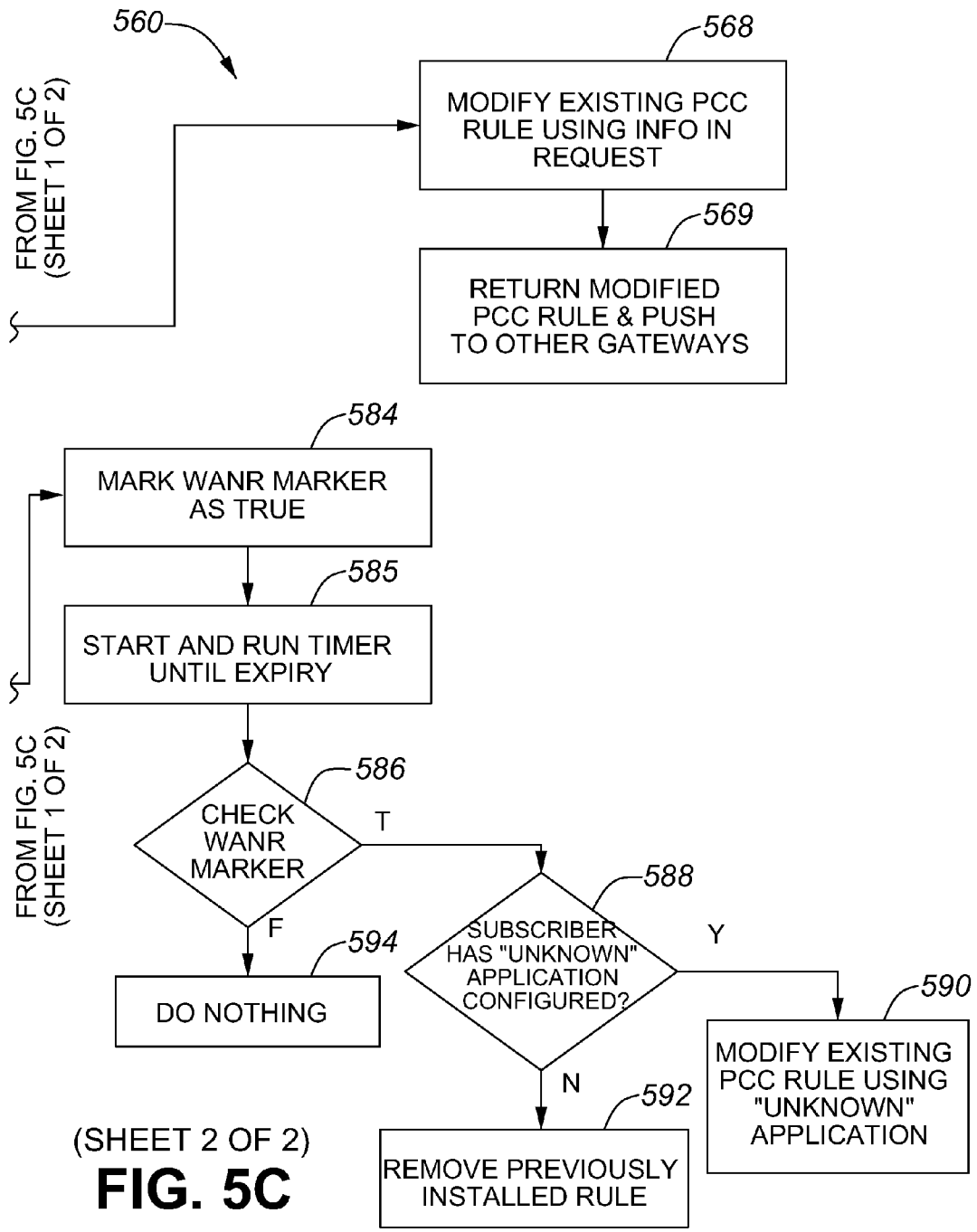
FIG. 5C (SHEET 2 OF 2)

US 9,306,756 B2

POLICY AND CHARGING RULES NODE EXPIRED MESSAGE HANDLING

RELATED APPLICATIONS

This application is a continuation of application Ser. No. 12/708,087, filed on Feb. 18, 2010, the entire disclosure of which is hereby incorporated herein by reference for all purposes as if fully set forth herein.

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks, leading to a less-than-elegant solution. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212, 29.213, and 29.214 specifications provide some guidance on PCC rule generation by the PCRF when receiving messages from at least two different sources, such as, for example, the application node (AN) and the PCEF. These specifications suggest the use of a timer when the first message is received, wherein the timer triggers the PCRF to set a period to expect receipt of a second message before generating a PCC rule. When the PCRF receives the second message before the timer expires, the PCRF generates the PCC rule using information included in both the first and second received messages.

The 3GPP standards do not, however, describe how to handle PCC rule generation when the PCRF receives only one message before the timer expires. Such functionality is crucial to the operation of the EPC. Without a satisfactory means to handle such occurrences, the PCRF may drop service requests altogether, which may greatly and adversely affect the overall functionality of the system.

In view of the foregoing, it would be desirable to provide a method for handling complementary messages. In particular, it would be desirable to provide a PCRF that may handle complementary messages if one expected message is not received.

SUMMARY

In light of the present need for a method for handling expired messages by the PCRF, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Policy and Charging Rules Node (PCRN) for processing a first request message from a first device to generate at least one Policy and Charging Control (PCC) rule, the method comprising receiving the first request message, starting a timer to begin a period for the PCRN to receive a second message from a second device before generating a first PCC rule, the second message being a mate of the first message, generating the first PCC rule based at least on the information received in at least the first request message received by the PCRN when the timer expires and forwarding the first PCC rule to at least one gateway.

Various exemplary embodiments may also relate to a method performed by a Policy and Charging Rules Node (PCRN) for processing a first request message from a first device to generate at least one Policy and Charging Control (PCC) rule, the method comprising receiving a first request message containing flow information, determining the status of a Packet-Filter-Operation associated with the first request message, determining whether a first PCC rule exists that is a mate to the flow information, checking at least one marker included in the service flow, generating the first PCC rule using the information received by the PCRN when the first PCC rules does not exist as a mate to the flow information, starting a timer beginning a period to receive a second message from a second device, the second message being a mate of the first message and pushing the first PCC rule to at least one gateway.

Various exemplary embodiments may also relate to a Policy and Charging Rules Node (PCRN) for processing at least a first request message to generate at least one Policy and Charging Control (PCC) rule, the PCRN comprising an Rx interface that receives a first request message from an application node, a Gx interface that receives a second request message from a gateway, the second request message being a mate to the first request message and containing flow information complementary to the service flow, a mate checker to determine whether the PCRN received a mate message when the PCRN receives at least one of the first and second messages, a timer to begin a period to receive a mate message when the PCRN receives at least one of the first and second messages and did not yet receive the mate message and a rule processor to create the PCC rule using at least one of the first and second messages when the period elapsed.

It should be apparent that, in this manner, various exemplary embodiments enable dynamic creation of policy and charging control rules in response to a network originated application request. Particularly, by translating an application request message into a number of requested service flows, a policy and charging rules node may generate a rule to provide each requested service flow that is dynamically based on the requested application, subscriber data, and/or rule-based policy decisions.

BRIEF DESCRIPTION OF THE DRAWINGS

In order to better understand various exemplary embodiments, reference is made to the accompanying drawings, wherein.

DETAILED DESCRIPTION

Figure 1:
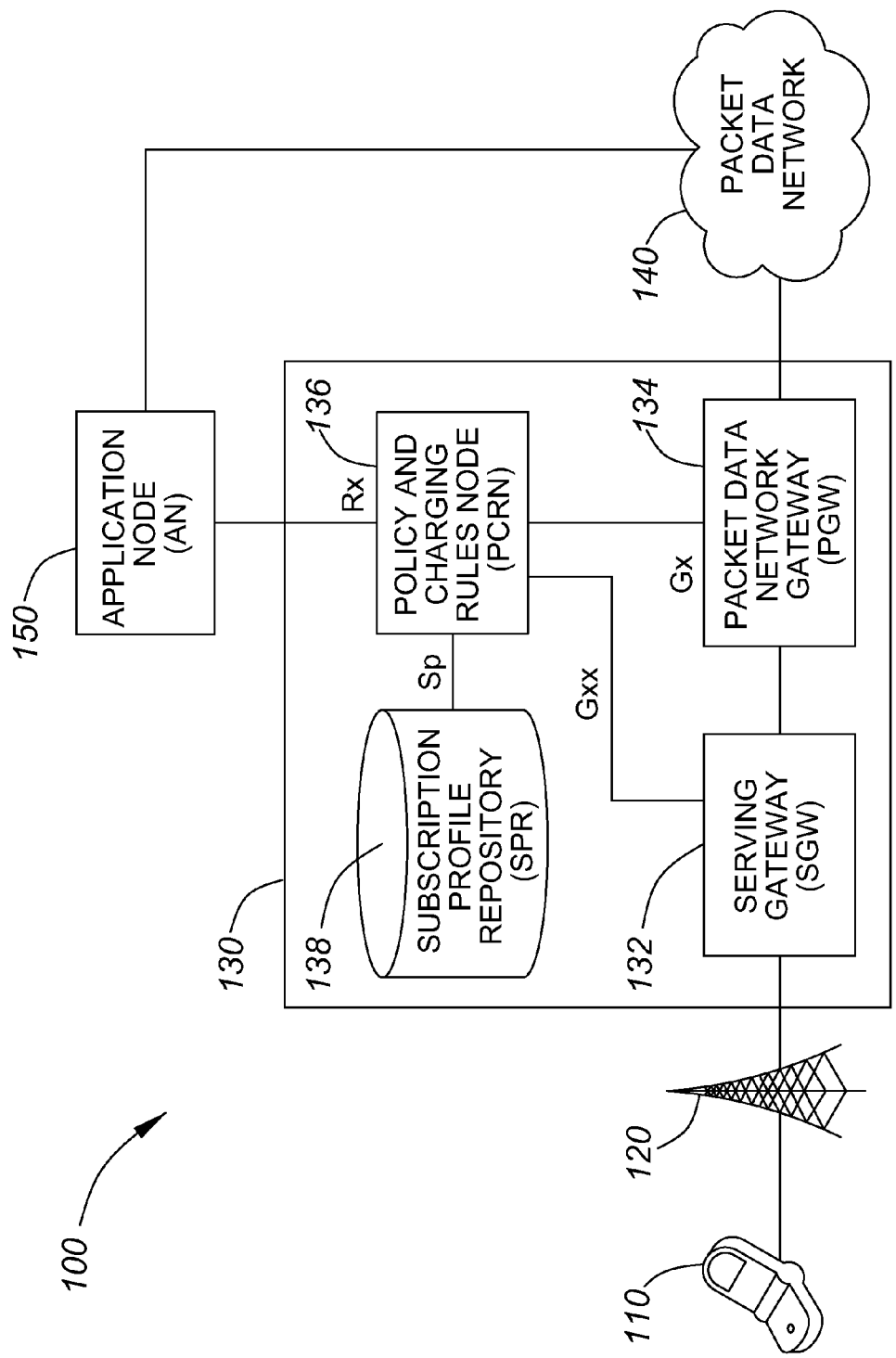
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be telecommunications network or other network for providing access to various services. Exemplary subscriber network 100 may include user equipment 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio communication, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile IP (PMIP) standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may include a number of additional features such as, for example, packet filtering, deep packet inspection, and subscriber charging support.

Policy and charging rules node (PCRN) 136 may be a device that receives requests for services, generates PCC rules, and provides PCC rules to the PGW 134 and/or other PCENs (not shown). PCRN 136 may be in communication with AN 150 via an Rx interface. PCRN 136 may receive requests from AN 150, SGW 132, or PGW 134. Upon receipt of a service request, PCRN 136 may generate at least one new PCC rule for fulfilling the service request.

PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, and subscriber priority.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or voice communication service to user equipment 110. AN 150 may further be in communication with the PCRN 136 of the EPC 130 via an Rx interface. When AN 150 is to begin providing application service to user equipment 110, AN 150 may generate a request message, such as an AA-Request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Figure 2:
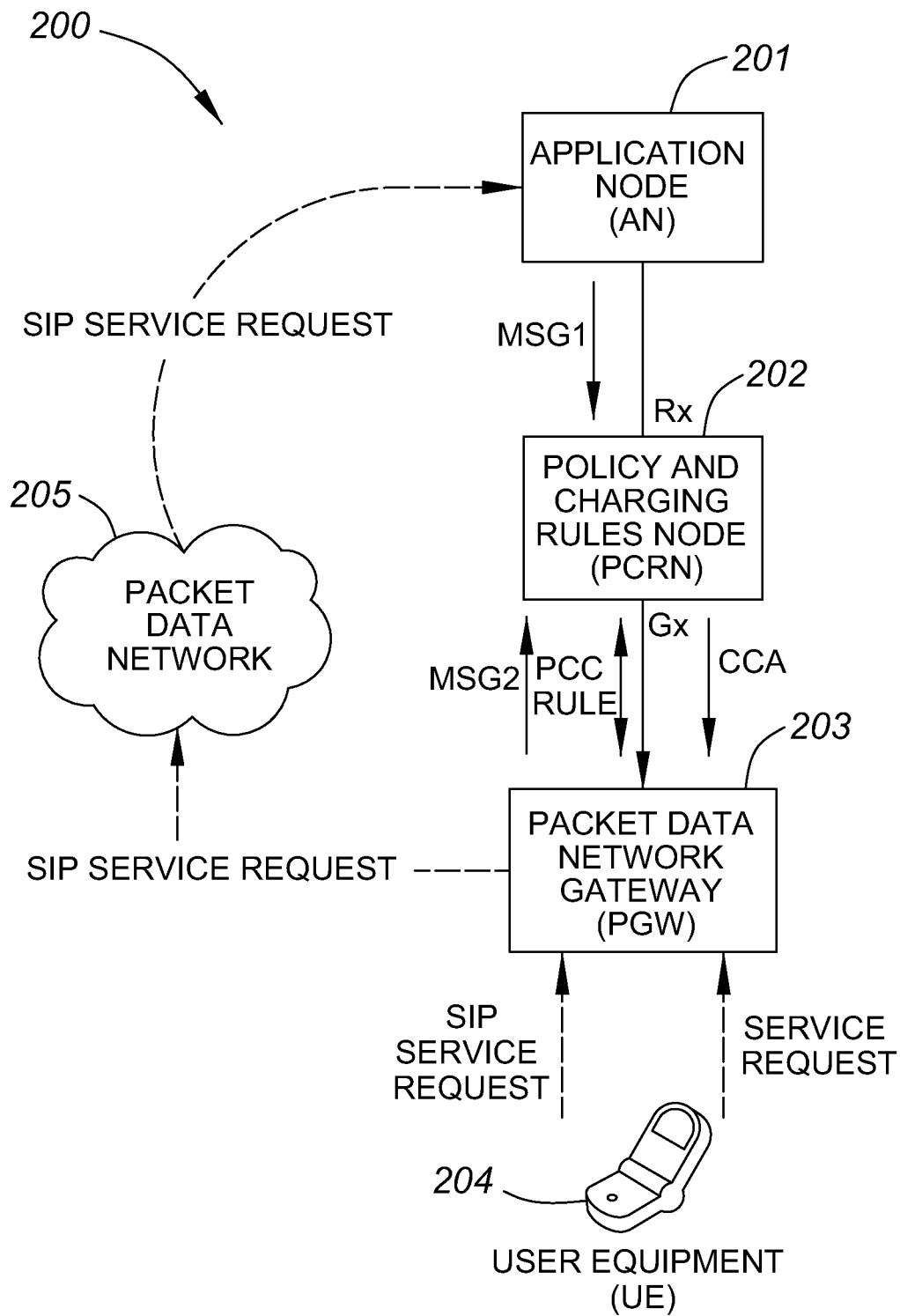
FIG. 2 illustrates an exemplary network for a PCRN receiving mate service requests.

FIG. 2 illustrates an exemplary communications network, with a PCRN receiving multiple messages for a service request. System 200 is similar to system 100, with application node (AN) 201, policy and charging rules node (PCRN) 202, packet data network gateway (PGW) 203, user equipment 204, and packet data network 205 corresponding to AN 150, PCRN 136, PGW 134, UE 110, and packet data network 140, respectively.

In system 200, UE 204 may send multiple related service requests through multiple devices, such as AN 201 and PGW 203, with the request eventually being sent to PCRN 202. PCRN 202 may then take the received service requests and form a PCC rule with the received information and other available information. PCRN 202 may then forward the PCC rule to PGW 203, which may transmit the PCC rule to other gateways, such as SGW 132.

UE 204 may send a session initiation protocol (SIP) service request that may be handled by application node (AN) 201. AN 201 may receive the service request through packet data network 205 and PGW 203. AN 201 may package the received service request into a message (MSG1) that may then be sent to the PCRF 202 via the Rx interface. The message sent by AN 201 may include information on the required bandwidth and type of media required. The message sent by AN 201 to the PCRN 202 may take precedent over other messages the PCRF 202 receives from other components so that when PCRF 202 receives conflicting information from other components (e.g., PGW 203), the PCRF 202 may use the information included in the message sent from AN 201.

The message sent by the AN 201 may be in the form of an AA-Request command. The AA-Request command may include a plurality of information, including the IP address of UE 204 (for example, in a Forward-IP-Address AVP or Framed-IPv6-Prefix AVP) and service information (for example, in a Media-Component-Description AVP). The AA-Request may also include information indicating the particular service to which a session may belong (for example, in an AF-Application-Identifier AVP).

UE 204 may also send another service request related to the SIP service request previously sent to AN 201. The related service request may be sent through PGW 203 to PCRF 202, where the PGW 203 sends the service request in the form of a CC Request message. PGW 203 may include a PCEF, which may include a service request in a message (MSG2) sent to the PCRF 202. The message sent from PGW 203 may be a mate message to the message sent from AN 201, as the PCRF 202 may use complementary information from both received messages when creating a PCC rule. The information included in the message sent from PGW 203 may include, for example, the required guaranteed bit rate.

PGW 203 may send a message in the form of a CC Request. The CC Request may include an Event-Trigger AVP and a Packet-Filter-Operation AVP, which may trigger certain actions by the PCRN 202, which will be discussed below in relation to FIGS. 5A-5C. The CC Request may also include a corresponding Packet-Filter-Information AVP.

The PCRN 202 may receive multiple messages containing information and may use the information to form a PCC rule. The PCRN 202 may use different procedures based on the initial message it receives. For example, if the PGW 203 containing the PCEF solicits a request for the provisioning of the PCC rule, the PCRF 202 may implement a PUSH procedure, as will be discussed further in relation to FIGS. 4A-4B, wherein the PCRN 202 provisions the PCC rule in a Re-authorization Request (RAR) command to the PGW 203. Alternatively, when the request is unsolicited (e.g., the request comes from AN 201), the PCRF 202 may implement a PULL command, as will be discussed further in relation to FIGS. 5A-5C, wherein PCRN 202 creates a PCC rule and includes the PCC rule in a CCA message.

Having described the components of subscriber network 100, 200 a brief summary of the operation of subscriber network 100, 200 will be provided. It should be apparent that the following description is intended to provide an overview of the operation of subscriber network 100, 200 and is therefore a simplification in some respects. The detailed operation of subscriber network 100, 200 will be described in further detail below in connection with FIGS. 3-5.

According to various exemplary embodiments, user equipment 204 may communicate with a plurality of devices, including the AN 201, SGW 132, or PGW 203 to indicate that user equipment 204 wishes to receive service. Such communication may occur via EPC 130 and packet data network 205 or via other communications channels (not shown). AN 204, SGW 132, or PGW 203 may then construct a message, including some of the necessary subscriber and data flow information necessary to provide the requested service. All of the necessary information may be scattered across multiple devices, such as the AN 201, SGW 132, SPR 138, and the PGW 203. AN 201, SGW 132, SPR 138 or PGW 203 may then forward the generated message to the PCRN 202 through the requisite interface. Upon receipt of the first message, PCRN 202 may start a timer to wait for the second, mate message. This timer may push the creation of the PCC rule to the end of an execution queue for the PCRN 202. For example, AN 201 may send a first message to the PCRN 202, which may then anticipate a second message from the PGW 203. The PCRN 202 may then place the generation of the PCC rule to the end of its execution queue, effectively waiting for the second message to arrive while executing other functions. When the PCRN 202 receives the second message before the timer expires, the PCRN 202 may immediately generate a PCC rule using information from both messages.

However, when the second message does not arrive before the timer expires, the PCRN 202 may then generate a PCC rule using the available information, which may include information from the first message, in addition to information from other sources, which may include, for example, information from existing PCC rules. PCRN 202 may also take subscriber data from SPR 138 and internally generated policy decisions into account when generating the PCC rule. PCRN 202 may then transmit the generated PCC rule to PGW 203 via the Gx interface for installation. After sending the PCC rule, PCRN 202 may then receive the second message, which may occur after the timer expired. In this example, after the first-generated PCC rule was pushed to the PGW 203, the PCRN 202 may receive a second message from the PGW 203. The PCRN 202 may then generate a second, new PCC rule using both the information in the previously-generated PCC rule specifically, the information from the first message and the information in the second message. The PCRN 202 may then remove the previously-generated rule from PGW 203 and transmit the new PCC rule to gateway PGW 203. After installation of the PCC rule, PGW 203 may then allow data communication for the requested data flow, while appropriately charging the subscriber and ensuring that a particular QoS is met.

Figure 3:
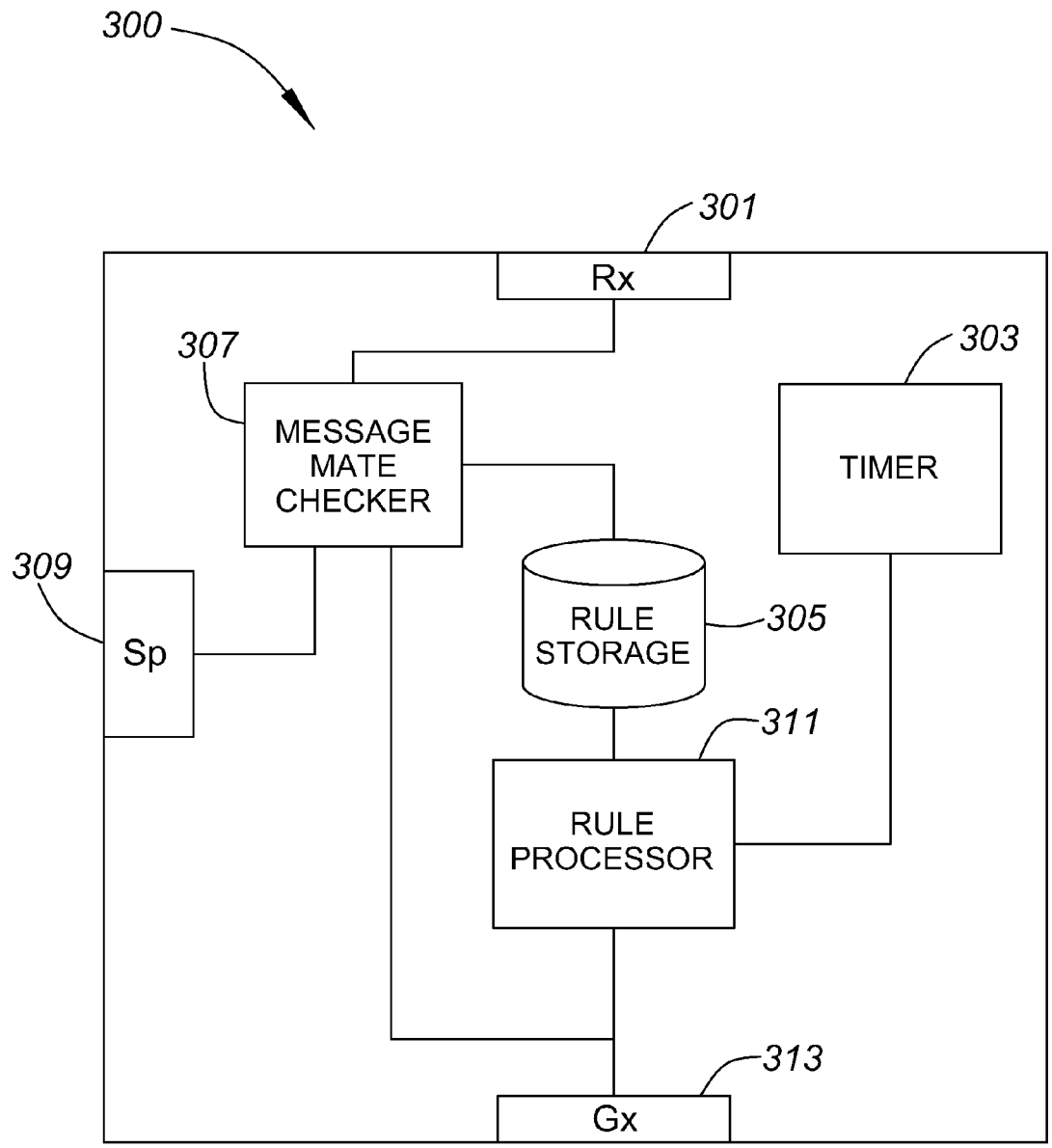
FIG. 3 illustrates an exemplary policy and charging rules node (PCRN) for creating new policy and charging control (PCC) rules in response to received service requests.

FIG. 3 illustrates an exemplary policy and charging rules node (PCRN) 300 for creating new policy and charging control (PCC) rules in response to at least one service request. PCRN 300 may correspond to PCRN 136, 202 of the exemplary subscriber network 100, 200. PCRN 300 may include an Rx interface 301, timer 303, rule storage 305, message mate checker 307, Sp interface 309, rule processor 311, and Gx interface 313.

Rx interface 301 may be an interface comprising hardware and/or executable instructions encoded on a machine-readable storage medium configured to communicate with an application function (AF) such as the AF included in AN 150, 201. Such communication may be implemented according to the 3GPP TS 29.214. Specifically, Rx interface 301 may receive a service request in a message, such as an application request (AAR) from AN 150. The PCRN 200 may translate an incoming service request message from the application node into a service flow. A service flow may include information described by the application message such as, for example, requested bandwidth, subscriber identifier, and/or data stream type.

Timer 303 may include hardware and/or executable instructions on a machine-readable storage medium configured to trigger a period where the PCRN 300 waits for a second, mate service request message to arrive after the PCRN 300 receives a first service request message. The timer 303 may be a time that sets a clock period for the PCRN 300 to explicitly wait to receive a second message. In alternative embodiments, the timer 303 may trigger the PCRN 300 to delay the creation of a PCC rule by placing the priority of such creation in the back of an execution queue. In such instances, the PCRN 300 passively "waits" for a period by executing other functions higher in its execution queue. When the PCC rule generation command occurs again in the execution queue, the PCRN 300 may again check to determine if the second, mate service request message has in fact arrived.

Rule storage 305 may be any machine-readable medium capable of storing PCC rules generated by the PCRN 300. Accordingly, rule storage 305 may include a machine-readable storage medium such as read-only memory (ROM), random-access memory (RAM), magnetic disk storage media, optical storage media, flash-memory devices, and/or similar storage media. Rule storage 305 may store definitions of numerous PCC rules created by PCRN 300. Such definitions may include, for example, rule names, service data flow filters, QoS parameters, and charging parameters.

Message mate checker 307 may include hardware and/or executable instructions on a machine-readable storage medium configured to receive messages from a plurality of interfaces and determine if the messages are mates. UE 110 may send complementary messages to a plurality of devices. These messages may include a plurality of information, with some information being whether it is expecting a complementary message. Message mate checker 307 may therefore correlate the at least two messages by determining if there is a matching message in the form of a matching application node (AN) request or gateway request. As will be discussed below in relation to FIGS. 4-5, message mate checker may check a plurality of markers to determine if a mate message should be expected and whether the incoming message is still waiting for the mate message to arrive.

Sp interface 309 may be an interface comprising hardware and/or executable instructions encoded on a machine-readable storage medium configured to communicate with a SPR such as SPR 138. Thus, Sp interface 309 may transmit record requests and receive subscription profile records.

Rule processor 311 may include hardware and/or executable instructions on a machine-readable storage medium configured to generate a new PCC rule based on a information included in, for example, service request messages. Rule processor 311 may first generate a new PCC rule object from the information received by the PCRN 300. Next, rule processor 311 may generate and store a PCC rule name for the new PCC rule. The PCC rule name may be generated according to any method known to those of skill in the art such as, for example, incrementing a previously assigned rule name or generating a random name. Rule processor 311 may also insert other data into the PCC rule. At this point, the new PCC rule may be a valid rule ready for installation or may require further modification.

Gx interface 313 may be an interface comprising hardware and/or executable instructions encoded on a machine-readable storage medium configured to communicate with a PGW such as PGW 134. Such communication may be implemented according to the 3GPP TS 29.212. Thus, Gx interface 313 may receive requests for PCC rules and transmit PCC rules for installation.

Figure 4A:
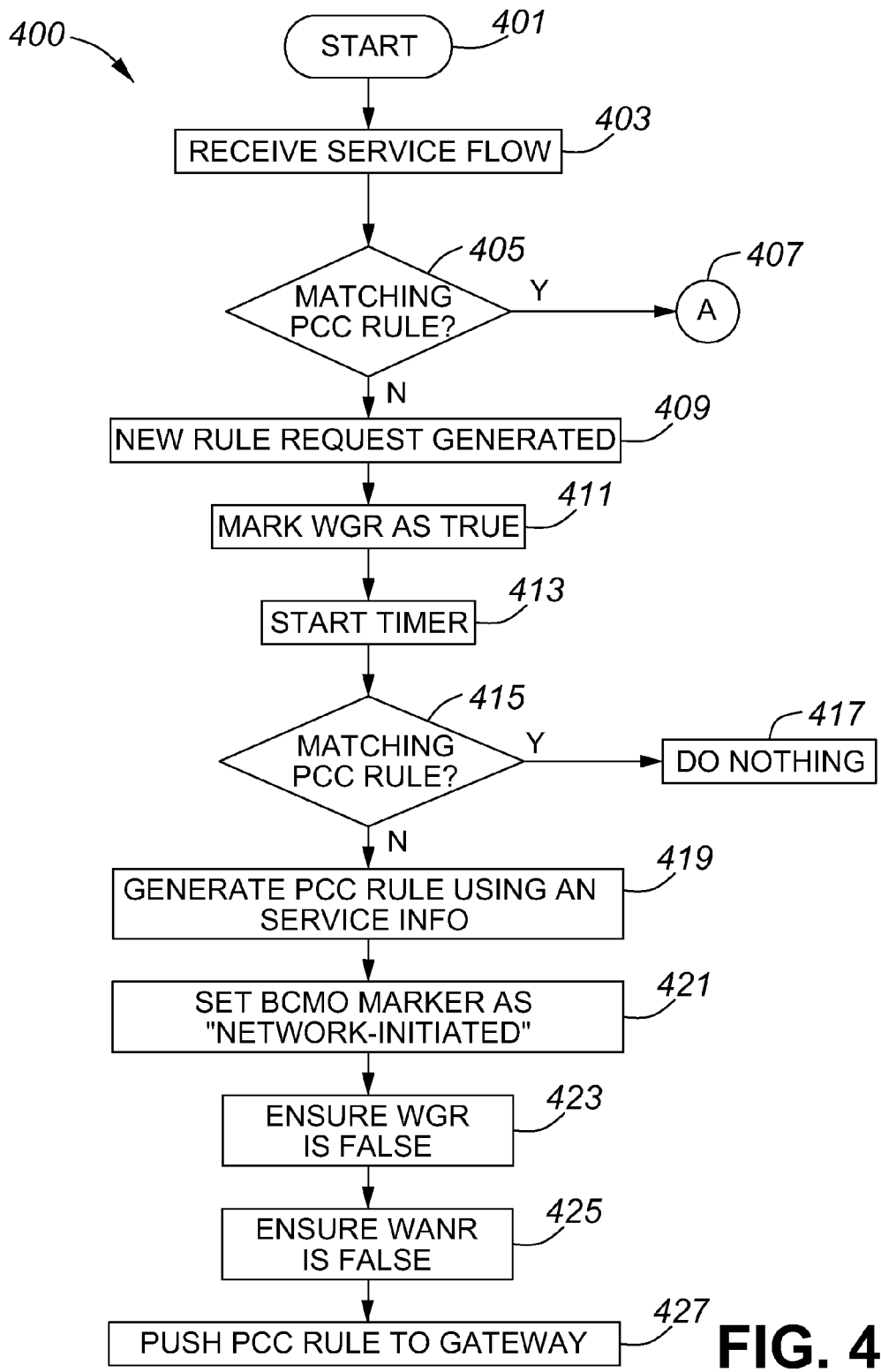
FIG. 4A illustrates an exemplary method for generating a PCC rule when receiving a message from an application node (AN)
Figure 4B:
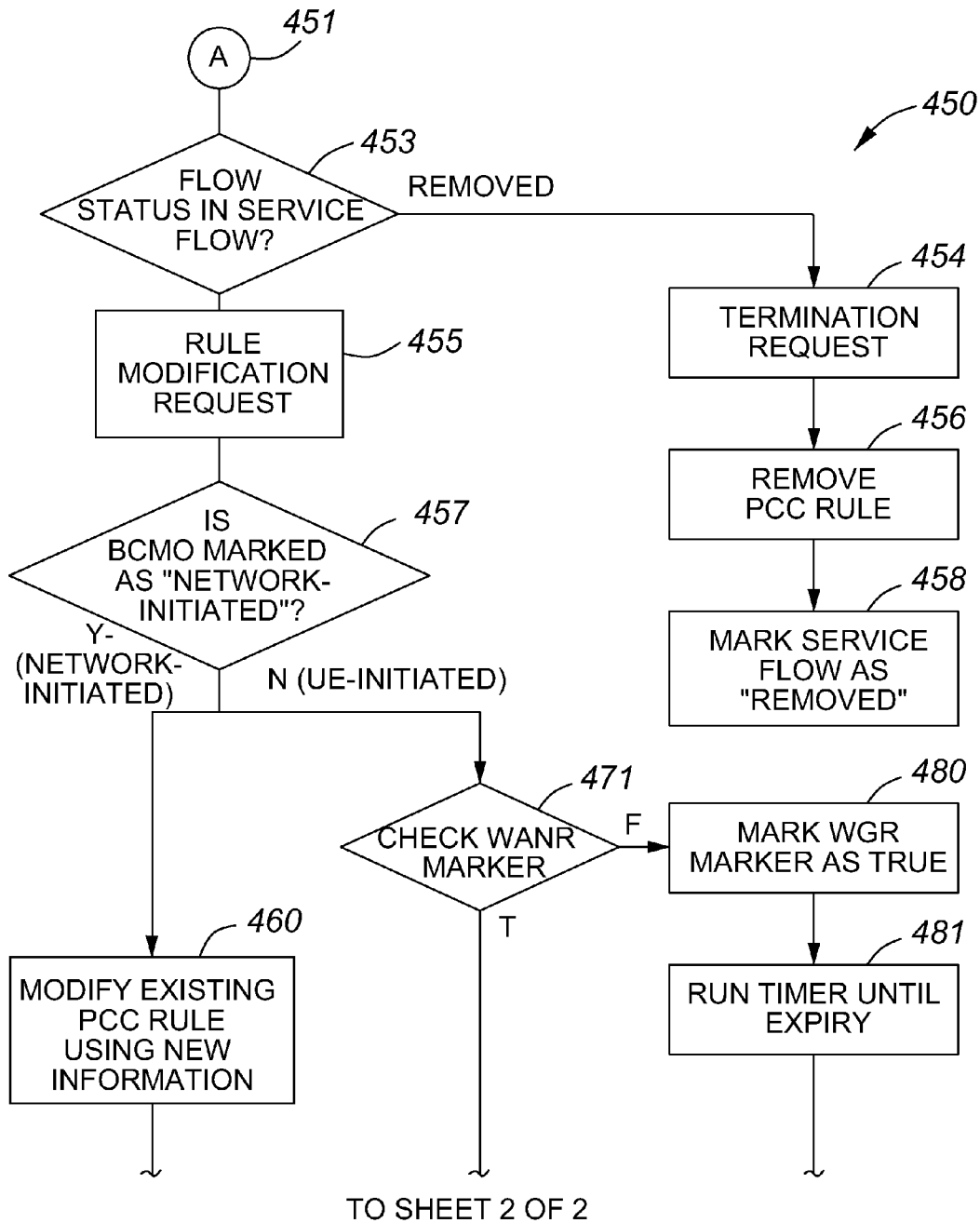
FIG. 4B further illustrates an exemplary method for generating a PCC rule when receiving a message from an application node.
Figure 4B:
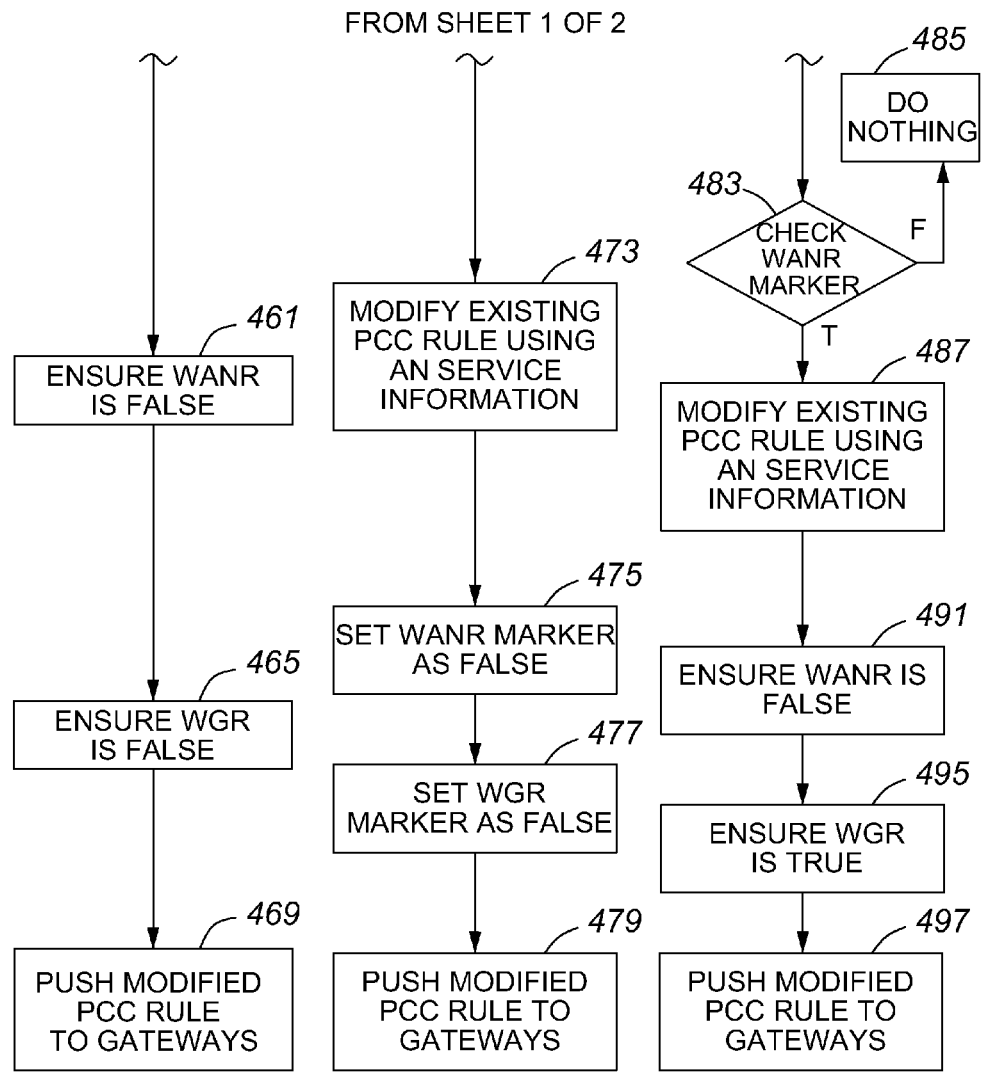

FIGS. 4A-4B illustrate an exemplary method 400, 450 for creating a new policy and charging control (PCC) rule in response to a service request from AN 150. Method 400, 450 may be performed by the components of PCRN 130 and/or PCRN 200, 302 to establish PCC rules for service data flows identified by at least the service request from AN 150.

Method 400 may begin at step 401 and proceed to step 403, where PCRN 130 may receive a service request from AN 150 in the form of a service flow via the Rx interface. Because the PCRN 130 receives a message from the AN 150 first, the corresponding PCC rule may be labeled as "Network-Initiated." The service flow may be derived from a hierarchy of components in an AN message. An AN message may consist of a plurality of Media Components (MC), with each Media Component containing a plurality of Media Sub-Components (MSC). Each Media Sub-Component may contain either one or two flow descriptions (FD). The service flow may be a flattened representation of this hierarchy, matching the one or two flow descriptions with the corresponding Media Components and Media Sub-Components. Each service flow may map to a distinct PCC rule that may be installed in the gateways SGW 132 or PGW 134. Accordingly, the PCC rule may contain a reference to the service flow used in its creation.

Method 400 may then proceed to step 405, where the policy decision module 240 inside PCRN 136 may determine whether a PCC rule exists in rule storage 260 that matches the received service flow. If there is a matching PCC rule, method 400 proceeds to step 407, which corresponds to step 407 of method 450, which will be further discussed in relation to FIG. 4B. If there is no matching PCC rule, this may indicate that the message from AN 150 initiated the request for a PCC rule, so the method proceeds to step 409, where the policy decision module 240 may generate a new PCC rule request.

In step 411, base rule generator 220 may generate a PCC rule, which includes a Waiting for Gateway Request (WGR) marker. The WGR marker included in the PCC rule may be a Boolean value that indicates that the service flow is still waiting for a mate gateway request to be received by the PCRN 136. Generation of the base PCC rule may also include, for example, generating a PCC rule name, service data flow filter, and initial QoS bandwidth parameters. During this step, the PCRN 136 may mark the message as "true," which indicates that the service flow is waiting for a mate gateway request to be received. In step 413, the PCRN 136 may start a timer to wait to receive the mate message from the PGW 134. PCRN 136 may wait for the mate message because the mate message may contain information complementary to the message received in the service flow.

The PCRN 136 may wait until either the timer expires or the mate gateway request arrives. In either case, method 400 proceeds to step 415, where the PCRN 136 determines if there is now a matching PCC rule in rule storage 260. If there is, this indicates that the gateway request arrived while the timer was still active. In this case, method 400 proceeds to step 417, wherein the PCRN 136 does nothing, as the PCC rule has the relevant information from both the service flow and from flow information in the gateway request.

If, however, there is no matching PCC rule, this indicates that the mate gateway request did not arrive by the time the PCRN's timer expired. In this instance, method 400 proceeds to step 419, where the base rule generator 220 creates a PCC rule using the service flow information from AN 150. This may be the first PCC rule, as it may still wait for updates from a mate gateway request. The PCRN 136 may indicate such status in step 421, where the PCRN 136 sets a Bearer Control Mode Operation (BCMO) marker as "Network-initiated," which indicates that the PCC rule was created as a result of only service requests from AN 150. If the BCMO marker is set as "UE-initiated," this may indicate that the PCC rule was created as a result of a service request from the UE 110 through PGW 134 or a service request from AN 150.

In step 423, the PCRN 136 first ensures that the service flow is not waiting for an AN request by checking the value of the WGR marker. If the WGR marker is set as false, the PCRN 136 does not change its value. Alternatively, if the WGR marker is set as true, the PCRN 136 may change the value of the WGR marker to false. This may ensure the PCRN 136 does not accidentally wait for a mate message that has already arrived.

In step 425, the PCRN 136 first ensures that the Waiting for Application Node Request (WANR) marker in the PCC rule is set a false by checking the value of the WANR marker. If the marker is false, the PCRN 136 does not change its value. Alternatively, if the WANR marker is set as true, the PCRN 136 may change the value of the WGR marker to false. The PCRN 136 then proceeds the step 427, where the PCRN 136 pushes the PCC rule to PGW 134.

Method 450 is a continuation of method 400 and may illustrate the actions of the PCRN 136 when the there is a matching PCC rule stored in rule storage 260 for the received service flow. Following step 451, which corresponds to step 407 of method 400, method 450 proceeds to step 453, wherein the policy decision module 240 determines whether the flow status in the service flow is removed. When the flow status in the service flow is removed, method 450 proceeds to step 454, where the PCRN 136 determines that the service request is a termination request. Following the termination request, in step 456, the PCRN 136 removes the PCC rule that matched the received service flow. In step 458, the PCRN 136 marks the service flow as "removed," creating no new PCC rule and taking no further action on the received service flow.

If, however, the service flow is not marked as removed, method 450 proceeds to step 455, where the PCRN 136 determines that the service request is a rule modification request, indicating that the PCC rule that matched the received service flow may be modified with at least the information included in the received service flow. Following step 455, in step 457, the PCRN checks the BCMO marker included in the PCC rule. If the BCMO marker indicates that the PCC rule is Network-initiated, then method 450 proceeds to step 460. However, if the rule is marked as UE-initiated, method 450 proceeds to step 471.

In step 460, the PCRN 136 updates the previously-matching PCC rule with the newly-received information from the other device, such as, for example flow information from the PGW 134. This may involve both removing the policy decision rule modifier 250 modifying the existing PCC rule stored rule storage 260 to reflect the new information received from the PGW 134. This may also involve PCRN 136 sending a CC Answer to PGW 134 to update the existing PCC rule that was previously sent by the PCRN 136.

In steps 461 and 465, the PCRN 136 acts similarly to steps 423 and 425, where the PCRN 136 ensures that the new PCC rule is not waiting for an AN request by checking that the WANR marker is set as false, and then ensures that the WGR is marked as not waiting for a mate gateway request. Method 450 then proceeds to steps 469, where the PCRN 136 removes the previous PCC rule and pushes the newly-created PCC rule to the PCEF in PGW 134, which may forward the updated PCC rule to other gateways.

Returning to step 457, if the BCMO of the PCC rule is marked as UE-initiated, method 450 proceeds to step 471, which corresponds to steps 427 and 461 of methods 400 and 450, respectively, where the PCRN checks the WANR marker of the PCC to determine whether the PCC rule is waiting for a mate AN request. If the WANR marker is set as true, the PCC rule is waiting for an AN request, which may indicate that the mate gateway request has already arrived.

If the gateway request has arrived, method 450 may then proceed to step 473, where the base rule generator 220 may then generate a new PCC rule using the information in the initially-received service flow and the information in the existing PCC rule. After generating the new PCC rule, in steps 475-477, the PCRN 136 marks both the corresponding WANR and WGR markers as false to indicate that the PCC rule and service flows are no longer waiting for a mate request to be received by the PCRN 136. In step 479, which correspond to step 469, the PCRN pushes the new PCC rule to the PCEF in PGW 134, which may send the new PCC rules to other gateways.

Returning to step 471, if the WANR marker is set as false, this may indicate that the PCC rule is not waiting for an AN request, which may indicated that the mate gateway request has not arrived. Accordingly, method 450 proceeds to step

480, where the PCRN 136 marks the WGR marker in the corresponding service flow as true, which may indicate that the service flow is waiting for a mate gateway request. Afterwards, method 450 proceeds to step 481, where the PCRN 136 starts a timer to wait for the mate gateway request.

In step 483, method 450 determines whether the WGR marker is set as true. The WGR marker may be set to false whenever the mate gateway request is received by the PCRN 136 via the Gx interface 285. Such a receipt by the PCRN 136 may occur before the timer expires. When the WGR marker is set as false, this may indicate that the gateway request arrived before the timer expired and the gateway may have otherwise picked up the rule. In this case, method 450 proceeds to step 485, where the PCRN 136 takes no further action. Otherwise, if at step 483, the WGR request is set as true, the service flow is still waiting for a mate gateway request and method 450 proceeds to step 487.

In step 487, the PCRN 136 may modify the existing PCC rule with the information in the received service flow. The newly-modified PCC rule may thus be similar to the previously-generated PCC rule except for the changes in the information included in the service flows. In step 491, which corresponds to 461, the PCRN 136 ensures that the WANR marker in the new PCC rule is set as false. In step 495, the PCRN 136 may ensure that the WGR marker in the received service flow is also set as true, as the PCRN 136 may not have received flow information from the PGW 134 and may have been generated with partial information. Afterwards, at step 497, the PCRN 136 may forward the new PCC rule to the PCEF in PGW 134, which may, in turn, forward the existing PCC rule to other gateways.

Figure 5A:
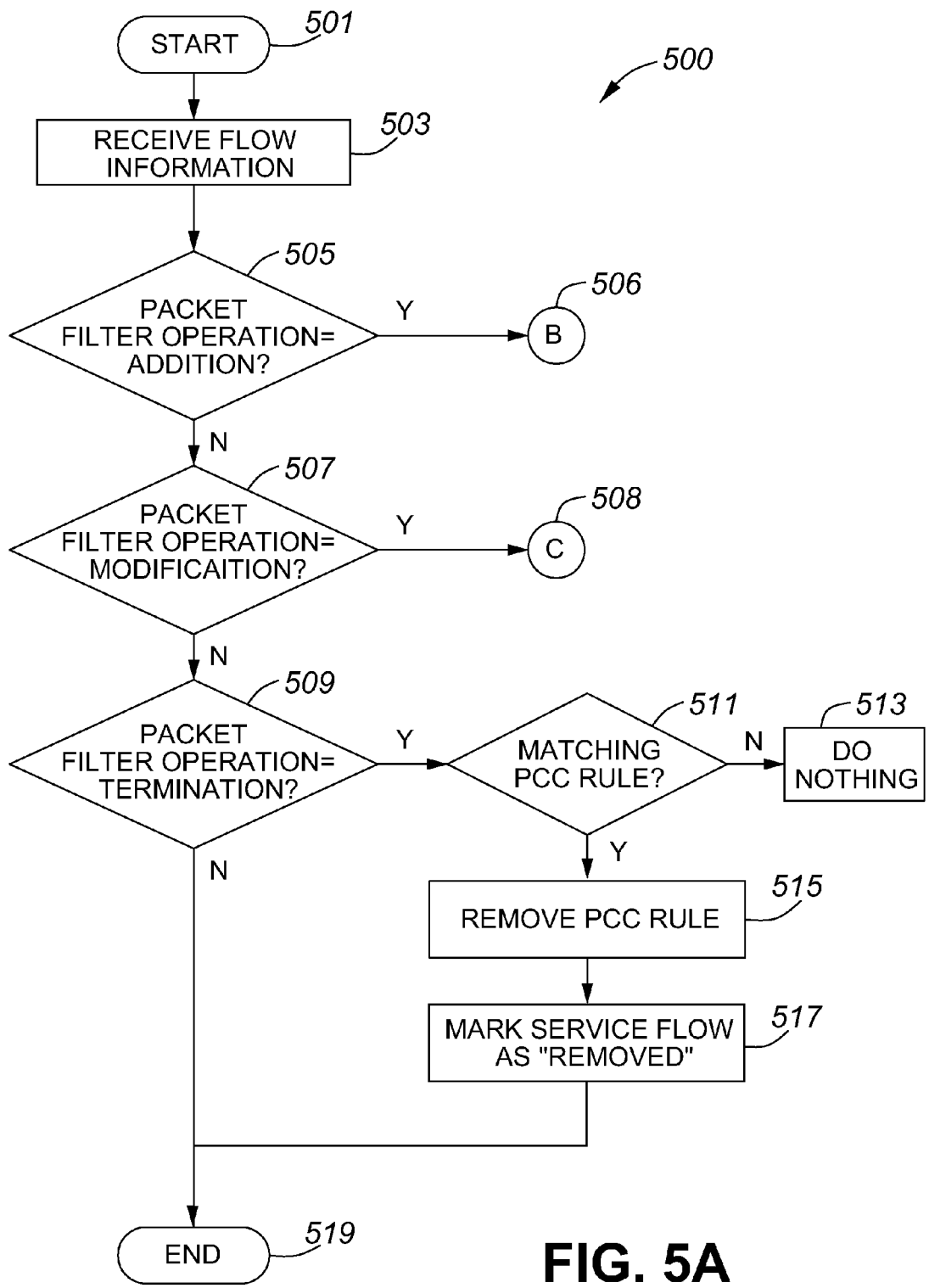
FIG. 5A illustrates an exemplary method for generating a PCC rule when receiving a message from a policy charging and enforcement function (PCEF)
Figure 5B:
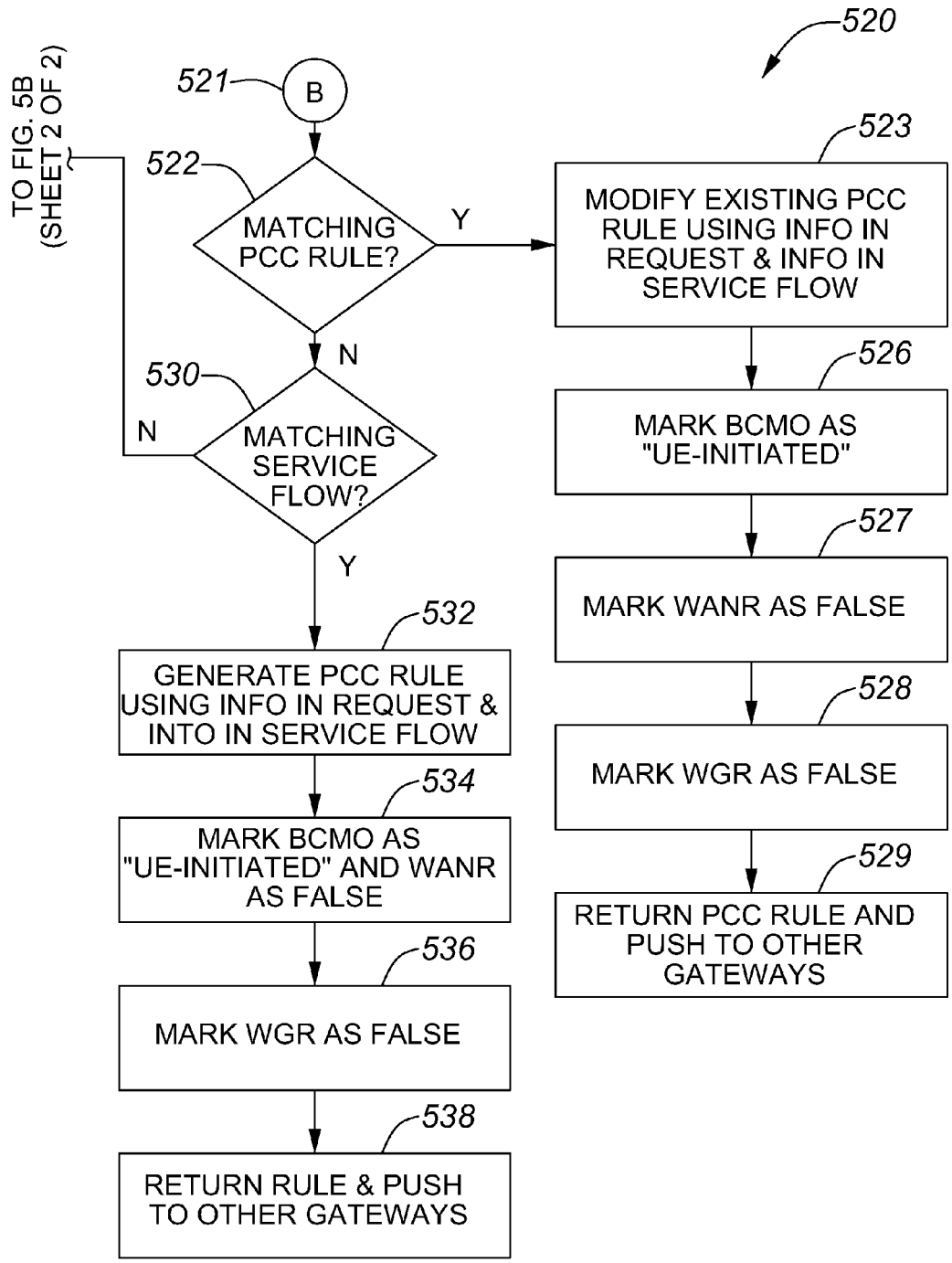
FIG. 5B further illustrates an exemplary method for generating a PCC rule when receiving a message from a policy charging and enforcement function (PCEF)
Figure 5B:
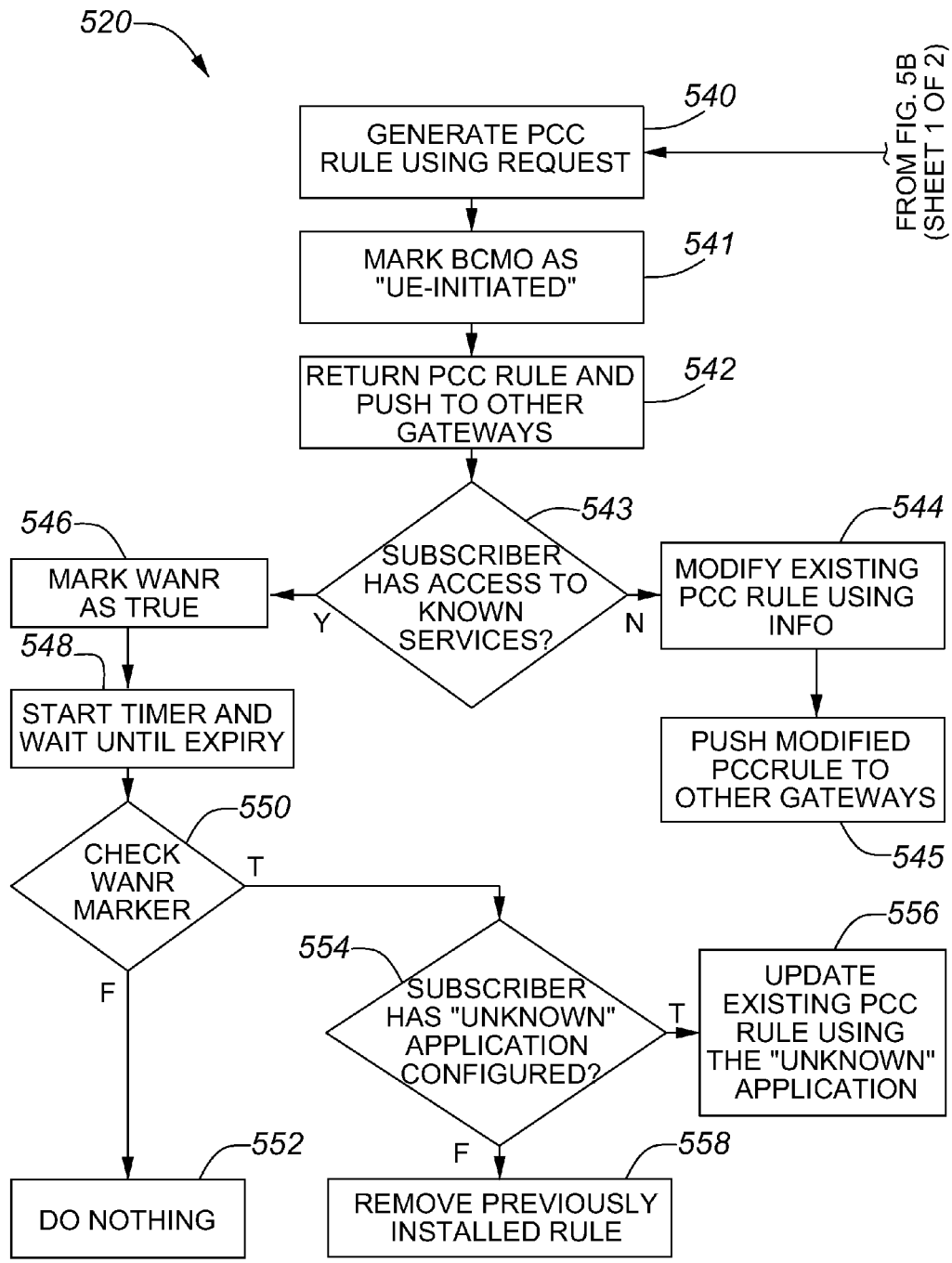
Figure 5C:
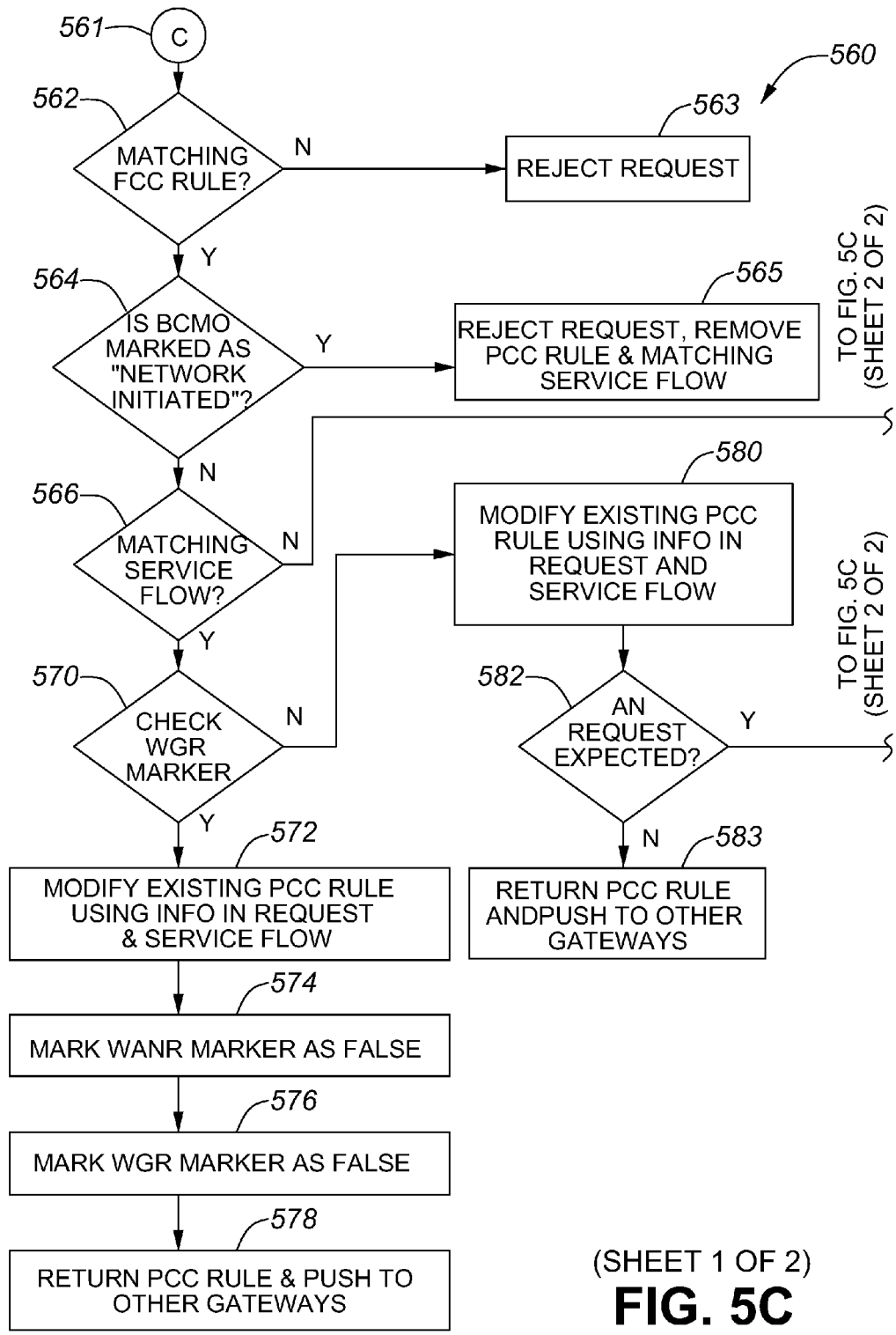
FIG. 5C further illustrates an exemplary method for generating a PCC rule when receiving a message from a policy charging and enforcement function (PCEF).

FIGS. 5A-5C illustrate an exemplary method 500, 520, 560 for creating a policy and charging control (PCC) rule in response to a service request from PGW 134. Method 500, 520, 560 may be performed by the components of PCRN 130 and/or PCRN 200, 302 to establish PCC rules for flow descriptions identified by at least the service request from the PCEF in PGW 134.

Referring now to FIG. 5A, method 500 begins at steps 501-503, where the PCRN 136 first receives a service request from PGW 134 that includes flow information. The flow information may be contained within a Packet-Filter-Information AVP included in the service request. The service request may also include a corresponding Packet-Filter-Operation AVP. In this instance, the PGW 134 initiated the service request; accordingly, the PCRN 136 may handle the service request based on the value of the corresponding Packet-Filter-Operation AVP.

The PCRN 136 may therefore in step 505 check if the Packet-Filter-Operation AVP is set to addition. If the Packet-Filter-Operation AVP is set to addition, method 500 proceeds to step 506, which begins method 520 of FIG. 5B, which will be discussed in further detail below; otherwise, method 500 proceeds to 507, where the PCRN 136 determines if the Packet-Filter-Operation AVP is set to modification. If at step 507, the PCRN determines that it is set to modification, method 500 proceeds to step 508, which begins method 560 of FIG. 5C, which will be discussed in further detail below; otherwise, method 500 proceeds to 509, where the PCRN 136 determines if the Packet-Filter-Operation AVP is set to termination. If not, the Packet-Filter-Operation is set to a faulty operation, so method 500 will proceed to step 519 where further operation ends.

When the Packet-Filter-Operation AVP is set to termination, method 500 proceeds to step 511, where the PCRN 136 determines whether rule storage 260 contains a matching PCC rule. If the rule storage 260 does not contain a matching PCC rule, there is no rule for the PCRN 136 to remove, so method 500 proceeds to step 513, where the PCRN 136 takes no further action. Otherwise, when there is a matching rule method 500 proceeds to step 515, where the PCRN 136 removes the matching PCC rule from the rule storage 260 and in step 517, marks the service flow corresponding to the matching PCC rule as removed before proceeding to end further operation in step 519.

Referring now to FIG. 5B, PCRN 136 enacts method 520 when the Packet-Filter-Operation AVP is set to addition. In such instances, the CC Request that comprised the service request may also include a Packet-Filter-Information AVP for each packet filter requested by the UE and a QoS-Information AVP, which may indicate the requested quality of service for the packet filter. Method 520 may begin at step 521, which corresponds to step 506 of method 500 in FIG. 5A.

In step 522, which may correspond to step 511 of method 500, the PCRN 136 may determine whether a matching PCC rule exists in the rule storage 260. If there is a matching rule in the rule storage 260, method 520 proceeds to step 523, where the PCRN 136 may modify the existing PCC rule stored in rule storage 260 using the flow information in the received service request from the PGW 134. The PCRN 136 may then in steps 526-528, mark the BCMO marker in the PCC rule as UE-initiated, mark the WANR marker in the PCC rule as false, and mark the WGR marker in the service flow as false, respectively. In step 529, the PCRN 136 may forward the new PCC rule back to PGW 134, which may in turn push the new PCC rule to other gateways.

Returning to step 522, if the PCRN 136 does not find a matching PCC rule in the rule storage 260, method 520 may proceed to step 530, where the PCRN 136 may determine whether it has received a matching service flow for the flow information in the gateway request. If there the PCRN 136 finds a matching service flow, this may indicate that the service request from AN 150 has arrived first and that the PCRN 136 may have already activated a timer to wait for receipt of the gateway request. PCRN 136 may therefore proceed to step 532, where it generates a new PCC rule using the flow information included in the gateway request and the information included in the received service flow. Subsequently, in step 534, PCRN 136 may mark the new PCC rules as UE-initiated and set the new PCC rule's WANR marker as false, indicating that the new PCC rule is not waiting for an AN request. In step 536, the PCRN 136 may set the WGR marker in the received service flow as false, indicating it is not waiting for a mate AN request. In step 538, the PCRN 136 may return the new PCC rule to the PGW 134, which may subsequently push the new PCC rule to other gateways.

Returning to step 530, if the there is no matching service flow, this may indicate that the gateway request has arrived at the PCRN 136 first. Accordingly, in step 540, the PCRN 136 may generate a PCC rule using the flow information included in the gateway request. In step 541, the PCRN 136 may set the BCMO marker in the newly-generated PCC rule as UE-initiated, indicating that the PCC rule was created in response to a gateway-initiated request. In step 542, the PCRN 136 may then return the newly-generated PCC rule to the PGW 134, which may subsequently push the newly-generated PCC rule to the other gateways in the network.

The PCRN 136 may then proceed to step 543, where the subscription rule modifier determines through contact with SPR 138 whether the subscriber of the UE 110 has access to known services. If the subscriber does not have access to known services, method 520 may then proceed to step 544. In this instance, the PCRN 136 may modify the existing PCC rule with the available information, which may include the flow information received from the gateway. PCRN 136 may then proceed to step 545, where it may push the new rule to the PGW 134, which may in turn forward the new PCC rule to other gateways.

Returning now to step 543, if the PCRN 136 determines that the subscriber has access to known services, the PCRN 136 may then set the WANR marker of the PCC rules as true, indicating that it is still waiting for a mate AN request. PCRN 136 may then start a timer at step 548, waiting for the mate AN request to arrive for the duration of the timer. At step 550, the PCRN 136 may then check the WANR marker again to determine whether it is still waiting for the mate AN request. If the WANR marker is now false, the PCRN 136 may proceed to step 552 and take no further actions, as the PCC rule is no longer waiting for a mate request. Otherwise, PCRN 136 may proceed to step 554, where it may then determine if the subscriber has an "unknown" application configured. If the subscriber does have an unknown application configured, the PCRN 136 in step 556 may then update the existing PCC rule using the information included in the unknown application. However, if the subscriber does not have an unknown application configured, the PCRN in step 558 may remove the previously generated and installed rule.

Referring now to FIG. 5B, PCRN 136 enacts method 560 when the Packet-Filter-Operation AVP is set to modification. Method 560 begins at step 561, which corresponds to step 508 of method 500 in FIG. 5A. Method 560 begins in step 562 by the PCRN 136 determining when there is a matching PCC rule in rule storage 260. If there is no matching PCC rule, there is no PCC rule to modify; PCRN 136 in step 563 therefore rejects the modification request as invalid. When in step 562 there is a matching PCC rule in rule storage 260, PCRN 136 then examines the BCMO marker of the matching PCC rule to determine whether the PCC rule is marked as Network-initiated. If the PCC rule is marked as Network-initiated, this may indicate that the UE-initiated PCC input is invalid. PCRN 136 may therefore proceed to step 565, where the PCRN 136 may reject the modification request and remove the matching PCC rule stored in rule storage 260 and the matching service flow.

If, however, the BCMO marker indicates that the matching PCC rule is UE-initiated, the PCRN may then proceed to step 566, where the PCRN 136 determines if there is a matching service flow for the gateway request. If there is no matching service flow, this may indicate that the gateway request initiated the generation of the PCC rule. Accordingly, PCRN 136 may in step 568 modify the existing PCC rule using the flow information in the gateway request. PCRN 136 may then in step 569 return the modified PCC rule to the PGW 134, which may in turn push the modified PCC rule to the other gateways.

Returning to step 566, if there is a matching service flow for the received gateway request, the PCRN 136 may then proceed to step 570 and check the WGR marker of the service flow to determine if it is still waiting for the gateway request. If the service flow is waiting for the mate gateway request to arrive, this may then indicate that the AN request has already been received by the PCRN 136 and that the PCRN 136 has either already generated a PCC rule and pushed the rule to the PGW 134, or that it has initiated a timer and is waiting for the gateway request. In either instance, method 560 proceeds to step 572, where the PCRN 136 may modify the existing PCC rule using information from the service flow and flow information from the gateway request. PCRN 136 may then proceed to steps 574-576, where it may mark the respective WANR and WGR markers as false. In step 578, PCRN 136 may then return the modified PCC rule to the PGW 134, which may subsequently forward the new PCC rule to the other gateways.

Returning to step 570, when the WGR marker of the service flow indicates that it is not waiting for a mate gateway request. Accordingly, method 560 may then proceed to step 580, where the PCRN 136 may modify the existing PCC rule using the flow information included in the gateway request and information included in the service flow. PCRN 136 may then in step 582 determine whether the AN request is actually expected. If a mate request is not expected, method 560 proceeds to step 583 and returns the modified PCC rule and push the modified PCC rule to the other gateways.

However, if a mate AN request is expected, in step 584, the PCRN 136 may set the WANR marker in the new PCC rule as true, indicating that it is waiting for a mate AN request. In step 585, PCRN 136 may then start a timer to wait for the mate AN request and wait for the AN request until the timer expires. In step 586, the PCRN 136 may again examine the WANR marker to determine if it is false. If the WANR marker of the new PCC rule remains true, in step 588, the PCRN 136 checks if the subscriber has an "unknown" application configured. If the subscriber has an unknown application configured, in step 590 the PCRN 136 may modify the existing PCC rule using information from the unknown application. If the subscriber does not have an unknown application configured, in step 592 the PCRN 136 may removed the previously generated and installed PCC rule. Referring back to step 586, if the WANR marker changes to false, the PCRN 136 in step 594 takes no further action.

According to the foregoing, various exemplary embodiments provide for dynamic creation of policy and charging control rules in response to a plurality of service requests from multiple devices. Particularly, by generating a preliminary PCC rule based on the available information during the initial receipt of the service request, the PCRN may enable proper functioning of the communications system without disabling the use of specific PCC rules because a mate service request coming through another device was late in arrival.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN) for handling a request message, the method comprising:
   receiving, through an Rx interface, a request message including a request from a user equipment (UE) requesting a new service data flow;
   generating a first policy control and charging (PCC) rule based on first information carried by the request message and second information carried by a mate message, received at the PCRN through a Gx interface, associated with the request message, wherein the first information and second information both describe information used to establish the new service data flow; and
   communicating with a gateway (GW) to cause:
   removal of a second PCC rule from the GW, wherein the second PCC rule was generated based on the second information prior to receiving the request message, and installation of the first PCC rule at the GW.

2. The method of claim 1, further comprising, prior to receiving the request message:
   based upon receiving the mate message, starting a timer;
   waiting for the timer to expire; and
   based on expiration of the timer, generating the second PCC rule based on the second information carried by the mate message.

3. The method of claim 1, wherein the step of generating the first PCC rule comprises modifying the second PCC rule based on the first information.

4. The method of claim 1, wherein the request message is received from one of: the GW, a second GW, or an application node (AN).

5. The method of claim 1, further comprising: receiving a second request message from at least one of the GW and a different device;
   generating a third PCC rule based on the second request message;
   based upon receiving the second request message, starting a timer;
   waiting for the timer to expire;
   after expiration of the timer, determining whether a subscriber associated with the second request message has an unknown application configured; and
   based on the subscriber having an unknown application configured, modifying the third PCC rule based on information associated with the unknown application.

6. The method of claim 1, further comprising: identifying the request message as being associated with the second PCC rule by accessing at least one marker stored in the second PCC rule that indicates that the second PCC rule is waiting for the request message.

7. The method of claim 1, wherein communicating with the GW to cause installation of the first PCC rule at the GW comprises transmitting the first PCC rule to the GW.

8. A policy and charging rules node (PCRN) for handling a request message,
   the PCRN comprising: a memory; and
   a processor in communication with the memory, wherein the processor is configured to:
   receive, through an Rx interface, a request message including a request from a user equipment (UE) requesting a new service data flow;
   generate a first policy control and charging (PCC) rule based on first information carried by the request message and second information carried by a mate message, received at the PCRN through a Gx interface, associated with the request message, wherein the first information and second information both describe information used to establish the new service data flow; and
   communicate with a gateway (GW) to cause:
   removal of a second PCC rule from the GW, wherein the second PCC rule was generated based on the second information prior to receiving the request message, and installation of the first PCC rule at the GW.

9. The PCRN of claim 8, wherein the processor is further configured to, prior to receiving the request message:
   based upon receiving the mate message, start a timer;
   wait for the timer to expire; and
   based on expiration of the timer, generate the second PCC rule based on the second information carried by the mate message.

10. The PCRN of claim 8, wherein, in generating the first PCC rule, the processor is configured to modify the second PCC rule based on the first information.

11. The PCRN of claim 8, wherein the request message is received from one of: the GW, a second GW, or an application node (AN).

12. The PCRN of claim 8, wherein the processor is further configured to:
   receive a second request message from at least one of the GW and a different device;
   generate a third PCC rule based on the second request message;
   based upon receiving the second request message, start a timer;
   waiting for the timer to expire;
   after expiration of the timer, determine whether a subscriber associated with the second request message has an unknown application configured; and
   based on the subscriber having an unknown application configured, modify the third PCC rule based on information associated with the unknown application.

13. The PCRN of claim 8, wherein the PCRN is further configured to:
   identify the request message as being associated with the second PCC rule by accessing at least one marker stored in the second PCC rule that indicates that the second PCC rule is waiting for the request message.

14. The PCRN of claim 8, wherein, in communicating with the GW to cause installation of the first PCC rule at the GW, the processor is configured to transmit the first PCC rule to the GW.

15. A non-transitory machine-readable storage medium encoded with instructions for execution by a policy and charging rules node (PCRN) for handling a request message, the medium comprising:
   instructions for receiving, through an Rx interface, a request message including a request from a user equipment (UE) requesting a new service data flow;
   instructions for generating a first policy control and charging (PCC) rule based on first information carried by the request message and second information carried by a mate message, received at the PCRN through Gx interface, associated with the request message, wherein the first information and second information both describe information used to establish the new service data flow; and instructions for communicating with a gateway (GW) to cause:

removal of a second PCC rule from the GW, wherein the second PCC rule was generated based on the second information prior to receiving the request message, and installation of the first PCC rule at the GW.

16. The non-transitory machine-readable storage medium of claim 15, further comprising instructions for, prior to receiving the request message:

based upon receiving the mate message, starting a timer; waiting for the timer to expire; and based on expiration of the timer, generating the second PCC rule based on the second information carried by the mate message.

17. The non-transitory machine-readable storage medium of claim 15, wherein the instructions for generating the first PCC rule comprise instructions for modifying the second PCC rule based on the first information.

18. The non-transitory machine-readable storage medium of claim 15, wherein the request message is received from one of: the GW, a second GW, or an application node (AN).

19. The non-transitory machine-readable storage medium of claim 15, further comprising:

instructions for receiving a second request message from at least one of the GW and a different device; instructions for generating a third PCC rule based on the second request message;

instructions for, based upon receiving the second request message, starting a timer;

instructions for waiting for the timer to expire;

instructions for, after expiration of the timer, determining whether a subscriber associated with the second request message has an unknown application configured; and instructions for, based on the subscriber having an unknown application configured, modifying the third PCC rule based on information associated with the unknown application.

20. The non-transitory machine-readable storage medium of claim 15, further comprising: instructions for identifying the request message as being associated with the second PCC rule by accessing at least one marker stored in the second PCC rule that indicates that the second PCC rule is waiting for the request message.

* * * * *